Feb. 13, 1923.
A. H. ADAMS
1,445,260
METHOD OF AND APPARATUS FOR TESTING ELECTRICAL COILS
Filed Oct. 23, 1918
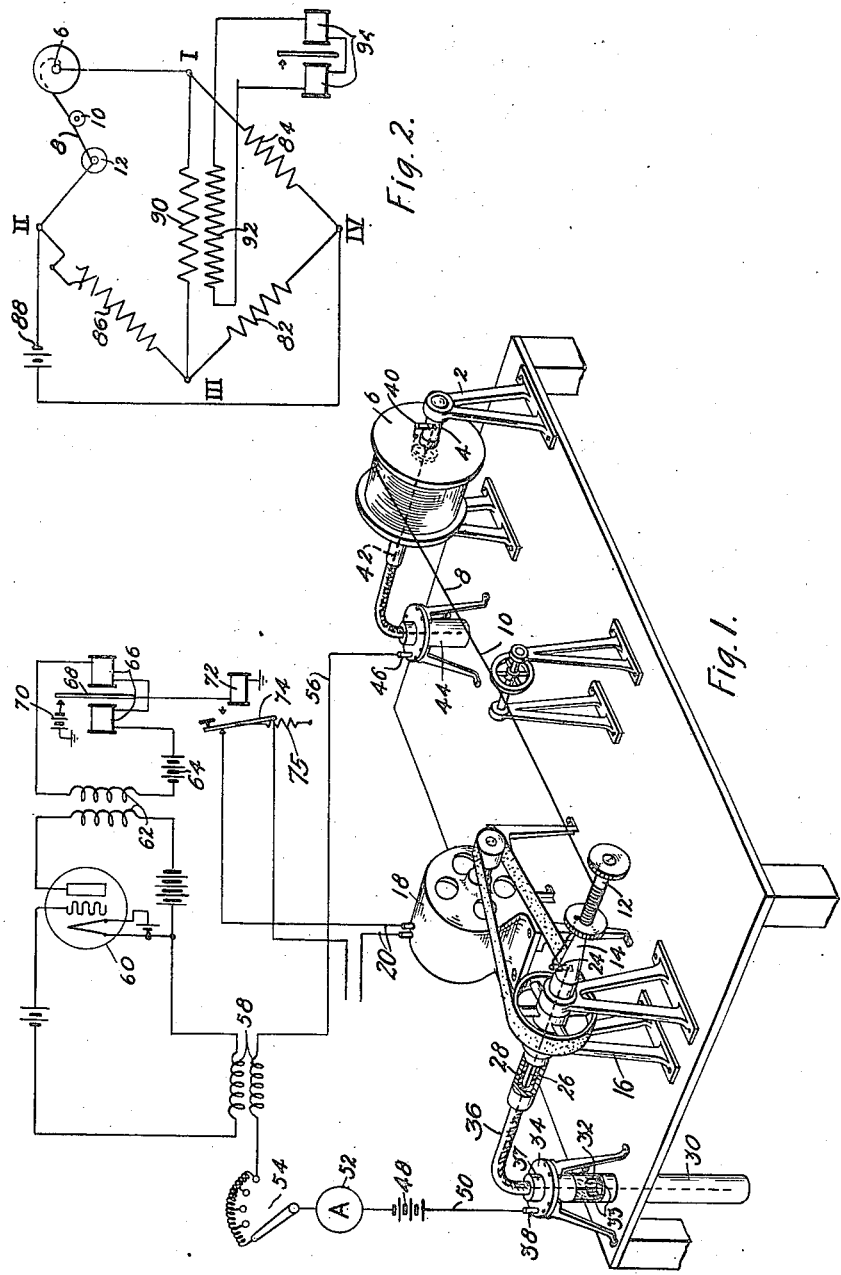
Inventor:
Arthur H. Adams.
by J.G. Roberts
Atty.

Patented Feb. 13, 1923.

1,445,260

UNITED STATES PATENT OFFICE.

ARTHUR H. ADAMS, OF SPARKILL, NEW YORK, ASSIGNOR TO WESTERN ELECTRIC COMPANY, INCORPORATED, OF NEW YORK, N. Y., A CORPORATION OF NEW YORK.

METHOD OF AND APPARATUS FOR TESTING ELECTRICAL COILS.

Application filed October 23, 1918. Serial No. 259,428.

*To all whom it may concern:*

Be it known that I, ARTHUR H. ADAMS, a citizen of the United States, residing at Sparkill, in the county of Rockland, State of New York, have invented certain new and useful Improvements in Methods of and Apparatus for Testing Electrical Coils, of which the following is a full, clear, concise, and exact description.

This invention relates to the testing of electrical coils as they are being wound for short circuiting of the turns of the winding.

As a means of avoiding the presence of short circuits in completed coils it has been proposed to test the insulation of each portion of the conductor used immediately before it is wound in place. However, such a procedure does not give an exact indication of whether turns of the conductor when wound in place would be short circuited, for on the one hand a slight defect in insulation that extends along the conductor less than the length of a turn can be disregarded if the insulation on the adjacent turns is sound, and on the other hand two defects in the insulation though not of sufficient magnitude to be detected by the testing apparatus may, especially if occurring in adjacent turns in different layers of the winding, result in short circuiting a considerable length of intermediate turns.

If the standard methods of testing coils for short circuits after they are wound are relied upon, not only is it practically commercially impossible to produce coils in which there are no short-circuited turns but in a greater or less number of the coils received from the winding machines the percentage of short-circuited turns will be excessive.

An object of this invention therefore is to provide for the production under commercially practicable conditions of electrical coils which are practically free from short-circuited turns. This is accomplished in the present instance by arranging that a defect in the insulation sufficient to cause a short circuit in the coil will be detected as soon as the short-circuited portion of the winding is completed, so that the defect may be repaired by removing the portion of the conductor at which it occurs or by repairing its insulation.

Further objects and advantages of the invention will be apparent from the following detailed description considered in connection with the accompanying drawing in which Fig. 1 is a partially diagrammatic representation of the preferred embodiment of the invention, and Fig. 2 is a diagram of a modification thereof.

In the preferred form of the invention shown in Fig. 1, there is mounted in suitable supports 2 a rotatable hollow shaft 4 upon which may be secured to rotate therewith a drum or spool 6 of insulated wire 8. The wire 8 passes from the spool 6 over a guide sheave 10 and is wound into a coil or on a spool or the like 12 secured to a horizontal hollow shaft 14 rotatably mounted in the supports 16. The shaft 14 is driven through suitable pulleys and belting or the like by an electrical motor 18 supplied with current through mains 20.

Extending through the wall of the hollow shaft 14 is a binding post 24 or the like, to the inner end of which is connected one end of a flexible conductor wire 26 extending axially through the hollow shaft 14, the wire and binding post being preferably insulated from the shaft by means of the insulation 28. The conductor wire 26 extends outwardly beyond the end of the shaft 14 and enters a receptacle 30 containing a mass of mercury 32 into which the wire extends. The wire 26 is of small diameter so as to minimize the disturbance its rotation produces in the mercury, but it extends into the mercury for considerable distance in order to provide a relatively large surface of contact between the wire and mercury; the resistance at this point is thus a very nearly constant minimum. To insure that the rotation of the wire will not produce a churning or vortex motion of the mercury vanes 33 may be mounted on the walls of the receptacle 30. As the shaft 14 is preferably horizontal, the conductor 26 is bent downwardly to enable it to enter the mercury, the portion of the conductor 26 between the end of the shaft 14 and the cover 34 of the receptacle 30 being provided with a flexible sheath 36, forming in effect a Bowden wire arrangement, and terminating in a member 37 rotatably mounted in the cover 34. Thus the wire is enabled to rotate with the shaft 14 and at the same time maintain contact with the mercury without becoming tangled or broken. A binding post or other terminal connecting means 38 is electrically connected to the mercury 32 either by having the receptacle 30 and cover 34 formed of metal or by means of a wire or the like leading from the terminal into the mercury.

A similar arrangement, comprising the binding post 40, wire 42, receptacle 44 and terminal 46, is provided for the rotatable hollow shaft 4. The terminal 38 is connected to one side of the battery 48 by the conductor 50 and the terminal 46 is connected on the other side, through the ammeter 52 and adjustable rheostat 54, by the conductor 56. Thus, when the respective ends of the wire 8 are connected to the terminals 24 and 40 respectively there is formed a complete electrical circuit including the entire length of the conductor 8.

Associated with this circuit by means of the repeating coil 58 is a thermionic or other amplifying device 60 which, in turn, is associated with a third circuit by means of the repeating coil 62. The third circuit comprises the battery 64 and the polarized or biased relay 66 which is adjusted to respond only to energizing currents induced by an increasing current in the first circuit; the armature 68 of relay 66 acts as a switch in a fourth circuit including the battery 70 supplying a constant electromotive force and electromagnet 72 which, through its armature 74, opens the supply circuit 20 to motor 18, and which may also be caused to control a visible or audible signal in a well known way. It is obvious that the circuit including the battery 70 may sometimes be omitted and the armature 68 caused to control the motor or signal circuit. The armature 74 is provided with a biasing spring 75 so that it will be held in its attracted or forward position until restored by hand to close the motor driving circuit.

By the use of suitably adjusted repeating elements in the above described circuits, a very slight increase in the current in the first circuit, i. e., that including the conductor 8, will open the motor circuit, while decrease of this current will, by reason of the adjustment of the relay 68 as described above, be of no effect in this particular.

The operation of the above described apparatus is as follows:

The supply drum 6 having been fixed on the shaft 4 and the conductor 8 having been led therefrom to the spool 12, which has been secured to the shaft 14, the ends of the conductor 8 are connected respectively to the binding posts 24 and 40. The rheostat 54 is then adjusted so that the current passing through the circuit of which the conductor 8 forms a part is of such strength that a very slight increase therein when amplified through the transformers 58, 60 and 62 will cause the polarized relay 66 to close the armature switch 68. The motor 18 is then put in operation and the rotation of the shaft 14 winds the insulated conductor 8 upon the spool 12.

So long as there is no short circuit between adjacent turns of the coil being formed on the spool 12, this current will not increase. It may be decreased by an increase in resistance of the circuit such as usually results from the bending and stretching of the wire 8 incident to winding from the drum 6 onto the spool 12, or by the breaking of a short circuit between turns on the supply spool as the wire is unwound therefrom. The resistance of the wires 26 and 42 and the resistance through the masses of mercury into which these wires dip, may also be increased by the agitation to which they are subjected by the revolution of the shafts 14 and 4. These and other increases in the resistance of the circuit may be compensated for by adjusting the rheostat 54 when the necessity therefor is indicated by the ammeter 52, and therefore maintaining across the terminals of the wire 8 a substantially constant electromotive force.

On the other hand, if a short circuit occurs between turns of the winding of the spool 12, the resistance of the circuit is reduced to a greater or less extent, depending upon the number of turns that are short circuited. By reason of the high order of sensitiveness of the arrangement comprising the thermionic repeater 60 and the polarized relay 66, an extremely slight increase in current in the circuit including the conductor 8, such as may result from the short circuiting of but one or two turns on the spool 12, will result in the operation of the relay 66 and consequently the opening of the motor circuit by the relay 72. The presence of a short circuit is therefore detected immediately upon its occurrence and the defect may therefore be corrected with a minimum of difficulty and expense.

In the modification shown in Fig. 2, the testing apparatus comprises a Wheatstone bridge arrangement, in the arm I—II of which is included the conductor 8 and which is being wound from the supply drum 6 to the spool 12, the connections for the ends of this wire being the same as those shown in detail in Fig. 1. The ratio arms I—IV and III—IV comprise the usual fixed resistances 82 and 84, and the arm II—III includes an adjustable resistance 86 of suitable type; the electromotive force supply source 88 is connected to the points II and IV, while the conjugate circuit between the points I and III comprises the low potential winding 90 of a transformer, of which the high potential winding 92 is included in circuit with the polarized relay 94 corresponding to the relay 66 of Fig. 1.

The arrangement illustrated in Fig. 2 operates in the following manner:

Wire 8 having been connected in the arm I—II of the Wheatstone bridge, the resistance 86 is adjusted so that no current passes through the conjugate circuit including the primary winding 90. However, if the resistance of the wire 8 changes, a current will in accordance with well known principles flow between the points I and III, through the winding 90, and an induced current will flow through the circuit including the polarized relay 94. The direction of this induced current will of course depend on the direction of the current through the winding 90 which in turn depends upon whether the resistance of conductor 8 is increasing or decreasing. As the resistance of conductor 8 will decrease only upon the occurrence of a short circuit between turns of the winding on spool 12 and as polarized relay 94 is adjusted to operate only in response to current induced as a result of a decrease in the resistance of conductor 8, the same result is obtained in this case as described in connection with the apparatus of Fig. 1.

Further modifications may be made in the circuit arrangements and electroresponsive devices, and other methods of mounting the supply of insulated conductor and the coil as it is being wound and of connecting the conductor 8 into the circuit may be adopted without departing from this invention as defined in the appended claims.

What is claimed is:

1. The method of testing the conductor of an electrical winding for short circuits between adjacent turns thereof as it is being wound, which consists in forming an electrical circuit of constant length which comprises the portion of the conductor being wound in place and the wound portions adjacent thereto and whose resistance automatically decreases only upon the occurrence of a short circuit in said portions of the conductor, said circuit also comprising a source of electromotive force, whereby the electromotive force in the circuit remains constant and causing increases in the current of said circuit to operate an electroresponsive device.

2. The method of testing the conductor of an electrical winding for short circuits between adjacent turns thereof as it is being wound, which consists in providing a circuit of constant length comprising the portion of the conductor being wound in place and the wound portions adjacent thereto and also comprising a source of electromotive force whereby the electromotive force in the circuit remains constant, and causing increases in the current in said circuit to operate an electroresponsive device.

3. The method of testing the insulation of the conductor forming the winding of an electrical coil as the coil is being wound which consists in passing through a circuit comprising the turns of the partially wound coil and the remaining unwound portion of the conductor, a current which increases only upon the short circuiting of adjacent turns of said conductor, and causing said increased current to operate an electroresponsive device.

4. In combination, in a machine for winding an electrical coil, and testing for a short circuit between adjacent turns thereof, a support for said coil as it is being wound, a support for a supply spool, a source of current, means for connecting one terminal of said source to the end of the conductor on said coil, and means for connecting the other terminal of said source to the end of the conductor on said supply spool to form thereby a circuit including the entire length of said conductor, and a polarized electroresponsive device inductively associated with said circuit.

5. In combination, in a machine for winding an electrical coil, a support for said coil as it is being wound, a support for a supply spool, a source of current, means for connecting one terminal of said source to the end of the conductor on said coil, and means for connecting the other terminal of said source to the end of the conductor on said supply spool to form thereby a circuit including the entire length of said conductor, a second circuit including a polarized electroresponsive device, and current amplifying means connecting the two circuits.

6. In apparatus for testing electrical coils as they are being wound, a horizontal shaft for supporting a coil or spool of wire as it is being wound or unwound, a receptacle containing a mass of mercury, means providing an electrical conducting path from said shaft to said mercury and comprising a rotatable conductor dipping into said mercury, means for connecting the other end of said conductor to one end of the wire on said coil or spool, and means for connecting said mercury to the other end of said wire on said coil or spool.

7. In apparatus for testing electrical coils as they are being wound, a horizontal rotatable hollow shaft for supporting a coil or spool of wire as it is being wound or unwound, a conductor wire extending axially along said shaft, a receptacle containing a mass of mercury, said conductor extending beyond one end of said shaft and having its outer end portion bent to extend downwardly into said mercury, means for connecting the other end of said conductor to one end of the wire on said coil or spool, and means for connecting said mercury to the other end of said wire.

In witness whereof, I hereunto subscribe my name this 18th day of October, A. D. 1918.

ARTHUR H. ADAMS.